United States Patent [19]

Autrey et al.

[11] Patent Number: 5,774,695
[45] Date of Patent: Jun. 30, 1998

[54] PROTOCOL INTERFACE GATEWAY AND METHOD OF CONNECTING AN EMULATOR TO A NETWORK

[75] Inventors: Kevin Autrey, Dallas; Robert J. Gessel, Plano, both of Tex.

[73] Assignee: Ericsson Inc., Richardson, Tex.

[21] Appl. No.: 620,474

[22] Filed: Mar. 22, 1996

[51] Int. Cl.⁶ .................................................. H04L 1/24
[52] U.S. Cl. ...................... 395/500; 364/578; 395/200.57
[58] Field of Search ............................ 364/578; 395/500, 395/200.01, 200.02, 200.1, 200.12, 200.2, 683, 200.57

[56] References Cited

U.S. PATENT DOCUMENTS

| | | | |
|---|---|---|---|
| 5,027,343 | 6/1991 | Chan et al. | 370/17 |
| 5,060,140 | 10/1991 | Brown et al. | 364/200 |
| 5,142,622 | 8/1992 | Owens | 395/200 |
| 5,278,823 | 1/1994 | Handel | 370/13 |
| 5,636,371 | 6/1997 | Yu | 395/500 |

OTHER PUBLICATIONS

Sun Microsystems Inc., Printout of an on–line tutorial of the SUN Operating System; Chapter 10: "A Socket–based Interprocess Communications Tutorial;" pp. 10–1 through 10–34; Chapter 11: An Advanced Socket–based Interprocess Communications Tutorial; pp. 11–1 through 11–46.

"Internet Programming" Jamsu, K. 1995, pp. 154–219.

*Primary Examiner*—Kevin J. Teska
*Assistant Examiner*—A. S. Roberts
*Attorney, Agent, or Firm*—Steven W. Smith

[57] ABSTRACT

A protocol interface gateway connects a telecommunication system emulator to a communications network. The gateway receives signals from the network and sends signals to the network that are formatted in a network protocol. The gateway converts signals received from the network into instructions in emulator code, and sends the instructions in emulator code to the emulator for processing. The emulator executes code in blocks of application software utilized in a target telecommunications node. The gateway then receives the processed instructions in emulator code from the emulator, converts the processed instructions into signals formatted in the network protocol, and sends the signals to the communications network. The protocol interface gateway utilizes a UNIX socket that replaces Open Systems Interconnection (OSI) layers 1 and 2 of the network protocol to send and receive the signals from the network.

17 Claims, 16 Drawing Sheets

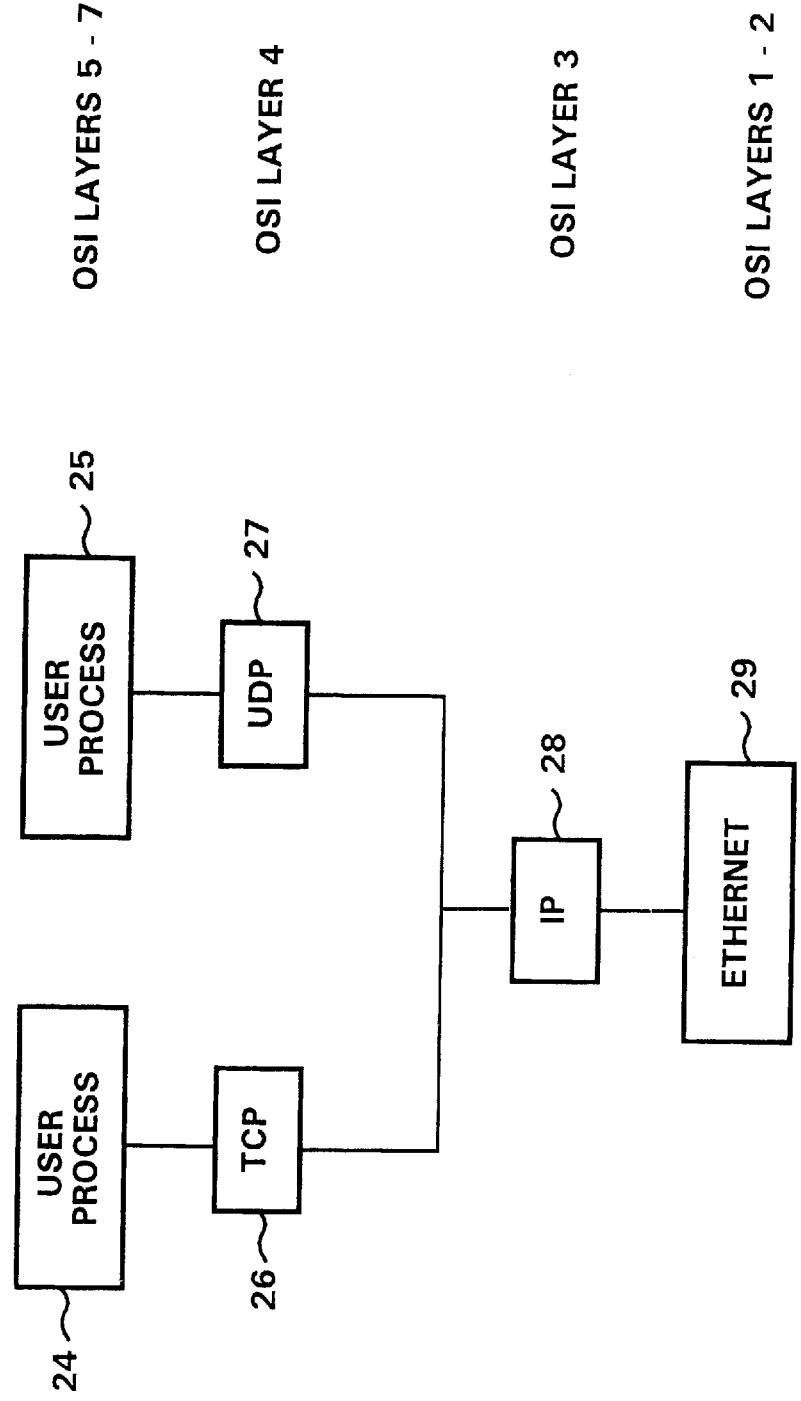

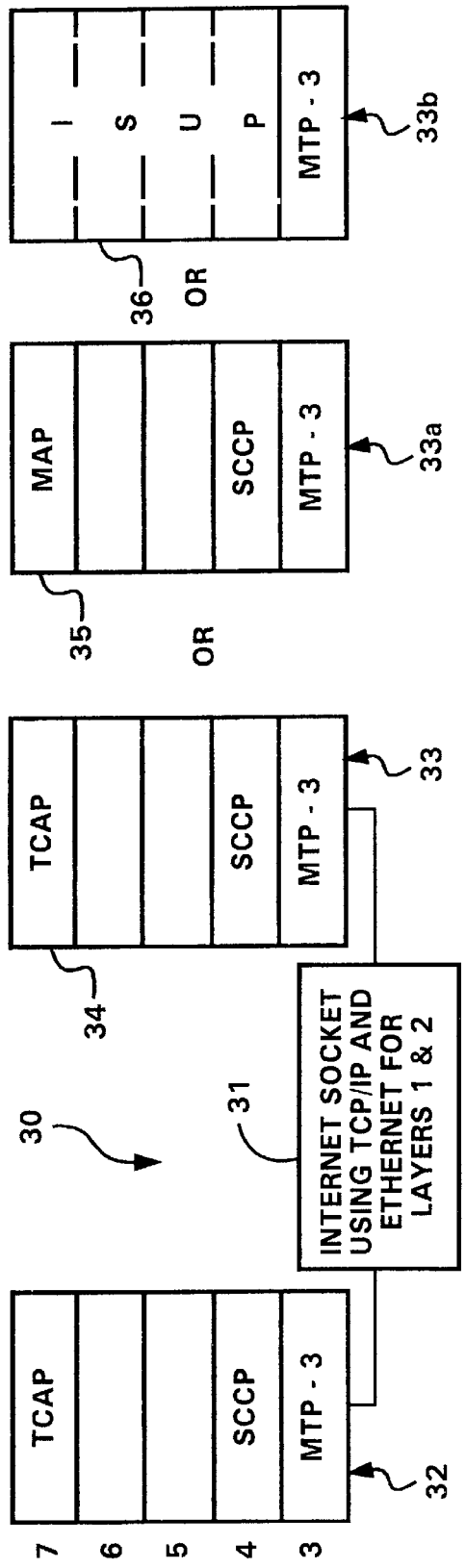
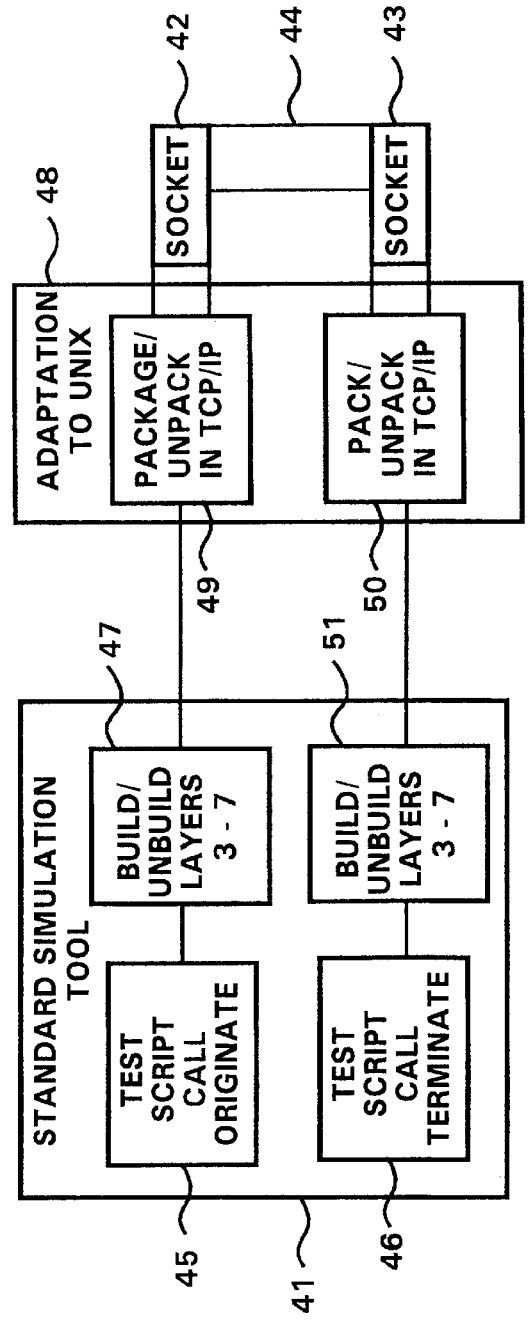

FIG. 16A

```
                                            ,-164
                                                                         ,-171
*** Received from MGTS Platform ********************************-'
--- Header -----------------------------------------------------------
Received from node: LIC1  (ST-0)                                      } 172
        Revision: 0      Protocol: 0     Direction:1
          Length: 0x0040  (64) octets
--- Data -----------------------------------------------------------  } 173
 Offset 0x0000: 83 1e 09 07 1f 09 07 00 01 16 7e b0 02 02 07 05
 Offset 0x0010: c3 ae 1e 09 07 04 05 c3 de 1f 09 07 0f 21 00 1f
 Offset 0x0020: 57 05 08 00 13 f1 30 00 01 00 01 17 12 05 48 72
 Offset 0x0030: 13 f1 30 00 01 00 08 39 11 30 63 04 00 01 00 00
*** End of received message ****************************************
*** Sent to MGTS Platform ******************************************
--- Header -----------------------------------------------------------
   Sending to node: LIC1 (ST-0)
          Revision:  0      Protocol: 0    Direction: 1
            Length:  0x0019 (25) octets
--- Data -----------------------------------------------------------
 Offset 0x0000: 83 1f 09 07 1e 09 07 10 06 41 c6 7e 00 01 0a 00
 Offset 0x0010: 08 20 07 02 06 00 04 01 09
*** End of sent message ********************************************
*** Sent to MGTS Platform ******************************************
--- Header -----------------------------------------------------------
   Sending to node: LIC1 (ST-0)
          Revision:  0      Protocol: 0    Direction: 1
            Length:  0x0011 (17) octets
--- Data -----------------------------------------------------------
 Offset 0x0000: 93 1f 09 07 1e 09 07 01 02 16 7e b0 03 00 01 02
 Offset 0x0010: 00
*** End of sent message ********************************************
*** Sent to MGTS Platform ******************************************
--- Header -----------------------------------------------------------
   Sending to node: LIC1 (ST-0)
          Revision:  0      Protocol: 0    Direction: 1
            Length:  0x0023 (35) octets
--- Data -----------------------------------------------------------
 Offset 0x0000: 83 1f 09 07 1e 09 07 01 06 16 7e b0 00 01 14 01
 Offset 0x0010: 00 11 05 02 13 f1 30 00 01 17 08 39 11 30 63 04
 Offset 0x0020: 00 01 00
*** End of sent message ********************************************
*** Sent to MGTS Platform ******************************************
--- Header -----------------------------------------------------------
   Sending to node: LIC1 (ST-0)
          Revision:  0      Protocol: 0    Direction: 1
            Length:  0x0019 (25) octets
--- Data -----------------------------------------------------------
 Offset 0x0000: 83 1f 09 07 1e 09 07 01 06 16 7e b0 00 01 0a 00
 Offset 0x0010: 08 20 07 02 06 00 04 01 09
*** End of sent message ********************************************
```

FIG. 16B
164

```
*** Received from MGTS Platform *******************************
--- Header --------------------------------------------------------
Received from node: LIC1 (ST-0)
         Revision: 0    Protocol: 0    Direction: 1
             Length: 0x0012 (18) octets
--- Data ----------------------------------------------------------
 Offset 0x0000: 83 1e 09 07 1f 09 07 00 06 03 00 01 00 01 03 00
 Offset 0x0010: 01 21
*** End of received message ***************************************
*** Sent to MGTS Platform *****************************************
--- Header --------------------------------------------------------
   Sending to node: LIC1 (ST-0)
         Revision: 0    Protocol: 0    Direction: 1
             Length: 0x0012 (18) octets
--- Data ----------------------------------------------------------
 Offset 0x0000: a3 1f 09 07 1e 09 07 01 04 16 7e b0 03 00 01 00
 Offset 0x0010: 00 00
*** End of sent message *******************************************
*** Received from MGTS Platform ***********************************
--- Header --------------------------------------------------------
Received from node: LIC1 (ST-0)
         Revision: 0    Protocol: 0    Direction: 1
             Length: 0x000f (15) octets
--- Data ----------------------------------------------------------
 Offset 0x0000: 83 1e 09 07 1f 09 07 00 05 03 00 01 16 7e b0
*** End of received message ***************************************
```

PROTOCOL INTERFACE GATEWAY AND METHOD OF CONNECTING AN EMULATOR TO A NETWORK

CROSS REFERENCE TO RELATED APPLICATIONS

This application is related to co-owned and co-pending U.S. patent applications Ser. Nos. 08/620,475, titled "System and Method of Testing Open Systems Interconnection (OSI) Layers in Telecommunications Networks," and Ser. No. 08/620,263, titled "Protocol Simulator and Method of Transmitting Simulated Open Systems Interconnection (OSI) Protocol Stacks Over a Network" filed concurrently herewith and hereby incorporated by reference as if quoted in their entirety herein.

BACKGROUND OF THE INVENTION

1. Technical Field of the Invention

This invention relates to development test systems and, more particularly, to a device and method of connecting a telecommunication system emulator to a network.

2. Description of Related Art

In the telecommunications industry, standard telecommunications networks are linked to each other using protocols based on the Open Systems Interconnection (OSI) model. The OSI model is an internationally accepted framework of standards for communication between different systems manufactured by different vendors. The OSI model creates an open systems networking environment where any vendor's computer system, connected to any network, freely shares data with any other computer system on that network or a linked network.

The OSI model organizes the communication process into seven different layers of interrelated protocols in a layered sequence based on their relation to the user. FIG. 1 is an illustrative block diagram of an OSI stack 10 illustrating the seven layers of the OSI model. Layers 1 through 3 deal with network access and layers 4 through 7 deal with end-to-end communications between the message source and the message destination. Each layer includes at least one function that is contained between an upper and a lower logical boundary. The services of each layer are combined with the services of lower layers to create new services that are made available to the higher layers. The layers are as follows:

Layer 1 is a physical layer that provides transmission of signals and the activation and deactivation of physical connections;

Layer 2 is a data link layer that includes signal synchronization, error correction, sequencing, and flow control. This layer also provides a data transmission link across one or several physical connections;

Layer 3 is a network layer that provides routing and switching functions;

Layer 4 is a transport layer utilizing layers 1 to 3 to provide an end-to-end service having required characteristics for the higher layer functions;

Layer 5 is a session layer that provides the means to establish a session connection and to support an orderly exchange of data and related control functions for a particular communication service;

Layer 6 is a presentation layer that provides means for data formatting and code conversion; and Layer 7 is an application layer, the protocols of which provide the actual service sought by an end user, During development and testing of telecommunication systems and new service applications, it is common to develop a set of interrelated software programs which, when combined, model or simulate the system hardware. The effects of adding new service applications, or the effects of proposed hardware or software changes in the system, can be rapidly modeled and analyzed without undergoing the costly and time consuming process of actually modifying the system hardware or loading a new service application in an actual system. Problems arise, however, and the cost of testing increases substantially when the functions to be tested require communications between two or more telecommunication systems.

Existing communication links utilized for linking standard telecommunications systems generally comprise computing software that executes and assembles OSI layers 3–7 and transmission hardware that executes OSI layers 1–2. When a link between two telecommunication systems, or between a telecommunication system and a system simulator is required for testing purposes, the systems are normally connected directly to each other with the same transmission hardware that is utilized for physically connecting installed telecommunication systems in the field. Test equipment and test tools are then connected to the systems and the physical links between them for the purpose of monitoring the links and performing protocol analyses or other evaluation tests.

However, there are several disadvantages to these existing test methods. First, the test equipment and test tools utilized for development testing of telecommunication systems are very expensive. Second, these existing test methods still require the utilization of physical transmission hardware between the systems under test which increases the setup time and the cost of the testing process. Third, these methods require substantial access time to a valuable telecommunication system which may be in great demand by a number of different development groups. Finally, the use of a physical telecommunication system and physical transmission hardware ties the tester to a physical location in close proximity to the system under test.

Although there are no known prior art teachings of a solution to the aforementioned deficiency and shortcoming, U.S. Pat. No. 5,027,343 to Chan et al. (Chan) discusses subject matter that bears some relation to matters discussed herein. Chan discloses a test access system for remote testing of products in an integrated services digital network (ISDN) system. The protocols tested relate to OSI layers 1–3 which are concerned mainly with the establishment, holding, and release of a physical telecommunications path. Chan packetizes or encapsulates network messages, including layers 1–3, and utilizes a packet switching network to communicate test procedures from the tester to the system under test. The system under test de-encapsulates the packets, removes the network messages, and sends them to be processed.

Chan overcomes some of the disadvantages of utilizing the same physical transmission hardware for testing that is used for transmissions between telecommunication systems in the field. However, Chan is specifically designed to support remote testing of actual physical hardware. A local site which includes a tester is remotely linked to a system under test. Chan specifically states, however, that the patent is directed only to OSI layers 1–3, which are concerned with the physical transmission, routing, and switching of signals. Chan, therefore, is a hardware-dependent solution which is very sensitive to hardware timing requirements. Chan does not teach or suggest any method of connecting multiple telecommunication systems or system emulators, without physical transmission hardware, for the testing of OSI layers 3–7.

It would be a distinct advantage to have a system and method for linking multiple telecommunication systems and/or telecommunication systems and system emulators with a protocol simulator for development testing of software implementing OSI layers 3–7 in a telecommunications node that does not require the utilization of the same transmission hardware that is utilized for physically connecting installed telecommunication systems in the field. Such a system and method would eliminate the need for expensive test equipment and test tools for monitoring the communication links and performing protocol analyses or other evaluation tests. The system would be independent of the transmission hardware utilized for normal telecommunication transmissions, and would not be sensitive to hardware timing requirements. A device and method of connecting emulators to various networks is required for such a system to operate most effectively. The present invention provides such a device and method.

SUMMARY OF THE INVENTION

In one aspect, the present invention is a protocol interface gateway for connecting an emulator to a network. The gateway comprises means for receiving signals from the network and sending signals to the network that are formatted in a network protocol. The gateway also includes means for converting the received signals into instructions in emulator code, and converting processed instructions in emulator code into signals in the network protocol. Additionally, the gateway includes means for sending the instructions in emulator code to the emulator and receiving the processed instructions in emulator code from the emulator. The protocol interface gateway may also utilize a UNIX socket that replaces Open Systems Interconnection (OSI) layers 1 and 2 of the network protocol to send and receive the signals to or from the network.

In another aspect, the present invention is a method of connecting an emulator to a network. The method comprises the steps of receiving signals formatted in a network protocol from the network with a protocol interface gateway; converting, in the protocol interface gateway, the received signals into instructions in emulator code; and sending the instructions in emulator code from the protocol interface gateway to the emulator for processing. The method also includes receiving the processed instructions in emulator code from the emulator with said protocol interface gateway; converting, in the protocol interface gateway, processed instructions in emulator code into signals in the network protocol; and sending signals in the network protocol from the protocol interface gateway to the network. The method may also include replacing Open Systems Interconnection (OSI) layers 1 and 2 of the network protocol with a UNIX socket.

BRIEF DESCRIPTION OF THE DRAWINGS

The invention will be better understood and its numerous objects and advantages will become more apparent to those skilled in the art by reference to the following drawing, in conjunction with the accompanying specification, in which:

FIG. 2A is a simplified block diagram illustrating the relationship between the various protocols utilized in the present invention;

FIG. 3 is a simplified block diagram of a communication link utilizing an Internet socket between two telecommunication system emulators utilizing protocols from the OSI model;

FIG. 4 is a simplified block diagram illustrating an embodiment of the present invention in which a protocol simulation tool has been modified to utilize an Internet socket and a LAN connection to link a call origination simulation with a call termination simulation;

FIG. 16 is a more detailed listing of the message monitor section of the PIG-tool status window of FIG. 15.

DETAILED DESCRIPTION OF EMBODIMENTS

During the development of new functions and services that are transmitted between telecommunication systems, OSI layers 1 and 2 (the physical hardware and the link to the network) are frequently unaffected. In contrast, layers 3–7 are almost always altered in some manner. In other words, the development of new functions and services does not always alter the means for transmitting information, but the information being transmitted is almost always changed. Therefore, testing that involves only OSI layers 3–7 does not require the expensive and specialized transmission test equipment that is connected between network models since the physical layer is usually not affected. Instead, developers can take advantage of the fact that most telecommunication systems support some type of local area network (LAN) protocol.

Figure 1:
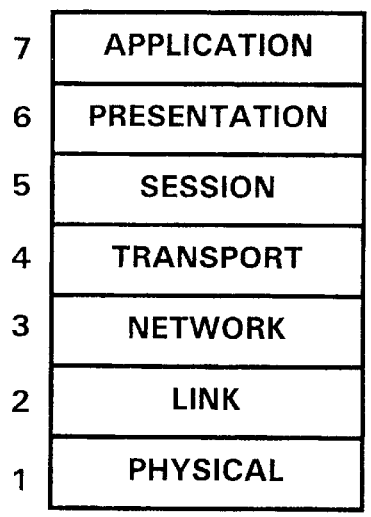
FIG. 1 (Prior Art) is an illustrative block diagram of an OSI stack illustrating the seven layers of the OSI model.
Figure 2:
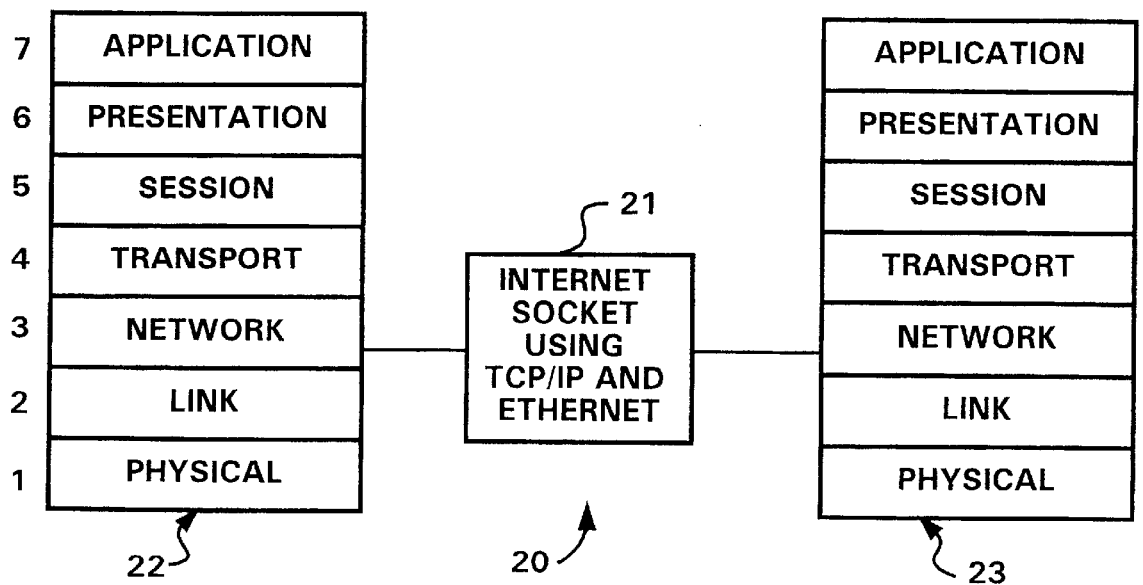
FIG. 2 is a simplified block diagram of a communication link utilizing an Internet socket between two OSI stacks connected at the layer 3 level in accordance with the teachings of the present invention.

FIG. 2 is a simplified block diagram of communication link 20 utilizing an Internet socket 21 between two OSI stacks 22 and 23 connected at the layer 3 level. In accordance with the teachings of the present invention, the existing level 1 and 2 telecommunication protocols, the physical level and the data link level, are replaced by a LAN protocol such as, for example Ethernet. The telecommunication protocol is encapsulated by the Transmission Control Protocol/Internet Protocol (TCP/IP) and then transmitted via a LAN network utilizing an Internet socket interface 21. The Internet socket interface 21 may be a type of UNIX file that provides network communications between applications operating on different host processors. The socket interface allows application programs to communicate with each other. In general, an application program creates a TCP client socket, connects to a TCP server socket, and then sends or receives data across that interface.

The Internet socket interface 21 may be thought of as a generalization of the UNIX file access mechanism that provides an endpoint for communication. Application programs request the operating system to create a socket when one is needed. Sockets are created without binding them to specific destination addresses. The application may then supply a destination address each time it uses the socket (e.g., when sending datagrams), or it may choose to bind the destination address to the socket and avoid specifying the destination repeatedly (e.g., when making a TCP connection). A client socket connects to a server socket to allow communication between application programs.

A standard Internet protocol is the User Datagram Protocol (UDP). The UDP protocol includes a protocol port number allowing a sender to distinguish among multiple destinations (application programs) on a remote processor. UDP/IP sockets are utilized for establishing, maintaining, and removing communications between application programs while TCP/IP sockets are utilized to transfer data reliably.

FIG. 2A is a simplified block diagram illustrating the relationship between the various protocols utilized in the present invention. User processes 24 and 25 comprise OSI layers 5–7. Data is transferred between the user processes 24 and 25 utilizing the TCP protocol 26 (OSI layer 4). Other communications between the user processes utilize the UDP protocol 27 (OSI layer 4). Both data and communications then utilize the IP protocol 28 (OSI layer 3) and Ethernet 29 (OSI layers 1–2) to complete the connection between the user processes.

Internet sockets may be utilized with traditional operations such as "read" and "write". For example, once an application program creates a socket and creates a TCP connection from the socket to a destination address, the application program may use the "write" operation to send a stream of data across the connection. A receiving application program on the other end may use the "read" operation to receive the data.

FIG. 3 is a simplified block diagram of a communication link 30 utilizing an Internet socket 31 between two telecommunication system emulators 32 and 33 utilizing protocols from the OSI model. As utilized herein, the term "emulator" refers to a software program that emulates the hardware of a processing node and interprets the application software as if the application software was running on a target machine. The term "simulator" refers to a processor that is preprogrammed with responses to anticipated messages. In the preferred embodiment, a protocol simulator and a telecommunication system emulator run on processors that are UNIX-based. Therefore, these systems communicate with each other utilizing an Internet socket and a LAN-based network such as, for example Ethernet. Protocol based information is communicated from a transmitting system to a receiving system utilizing LAN protocols supported by the telecommunication systems. Communications between the protocol simulator and the telecommunication system emulator utilize the Internet socket to transmit packaged data from OSI layers 3–7 in TCP/IP format on the LAN-based network. The receiving emulator receives the information from the protocol simulator via a protocol interface gateway utilizing sockets, unpacks layers 3–7, and processes the information. A fixed OSI layer 2 in the telecommunications protocol under test (e.g. Message Transfer Part (MTP)) may also be utilized since the communication link between the protocol simulator and the telecommunication system emulator is controlled by a completely different protocol stack associated with the Internet socket.

When the communication link is between telecommunication nodes, OSI layers 3–7 may correspond to any ANSI Signaling System 7 (SS7), CCITT, or other compatible protocol stack. FIG. 3 illustrates the transport of a Transaction Capabilities Application Part (TCAP) protocol stack 33 to stack 32 or vice versa. Also illustrated are a Mobile Application Part (MAP) protocol stack 33a and an Integrated Services User Part (ISUP) protocol stack 33b. TCAP 34 and MAP 35 are level 7 applications while ISUP 36 is a level 4–7 application. The SS7 stack may be transported through the Internet socket 31 over a LAN using Ethernet to replace the MTP layers 1 and 2. The physical target telecommunications node or telecommunication system emulator accepts the information on a TCP/IP link on the LAN and decodes the layer 3–7 information. Some telecommunication nodes may require modification for communication over TCP/IP with a LAN connection to replace their normal MTP layers 1 and 2. Such modifications are well known in the art and will not be expanded upon herein.

This communication process may also be utilized to communicate between a UNIX processor that outputs telecommunication signaling and a physical target telecommunication node that is equipped to receive the LAN information and extract the incoming signaling information.

FIG. 4 is a simplified block diagram illustrating an embodiment of the present invention in which a protocol simulation tool 41 has been modified to utilize Internet sockets 42 and 43, and a LAN connection 44 to link a call origination simulation 45 with a call termination simulation 46. In this embodiment, telecommunication protocol simulation software for layers 3–7 of the OSI model is transmitted from the call origination simulation 45 to the call termination simulation 46, and vice versa, without requiring any external network or hardware. The call origination simulation 45 comprises test script software that performs the call origination functions. These scripts are then built into layers 3–7 at block 47 and sent to a UNIX adaptor 48. The UNIX adaptor 48 packages the layers in TCP/IP format at block 49 for transmission through the Internet socket 42, the LAN connection 44, and the Internet socket 43 to a receiving side 50 of the UNIX adaptor 48 where the layers are unpacked. The layers are then unbuilt at block 51, and are sent to the call termination simulation 46 in the simulation tool 41. In this manner, signals from the simulation tool's software package are looped back into the simulation tool itself to enable test script verification of OSI layers 3–7.

Processing continues in a dialog as determined by the pre-programmed test script, with each script designed to send and receive protocol messages built with layers 3–7 of the communications protocol being tested.

Figure 5:
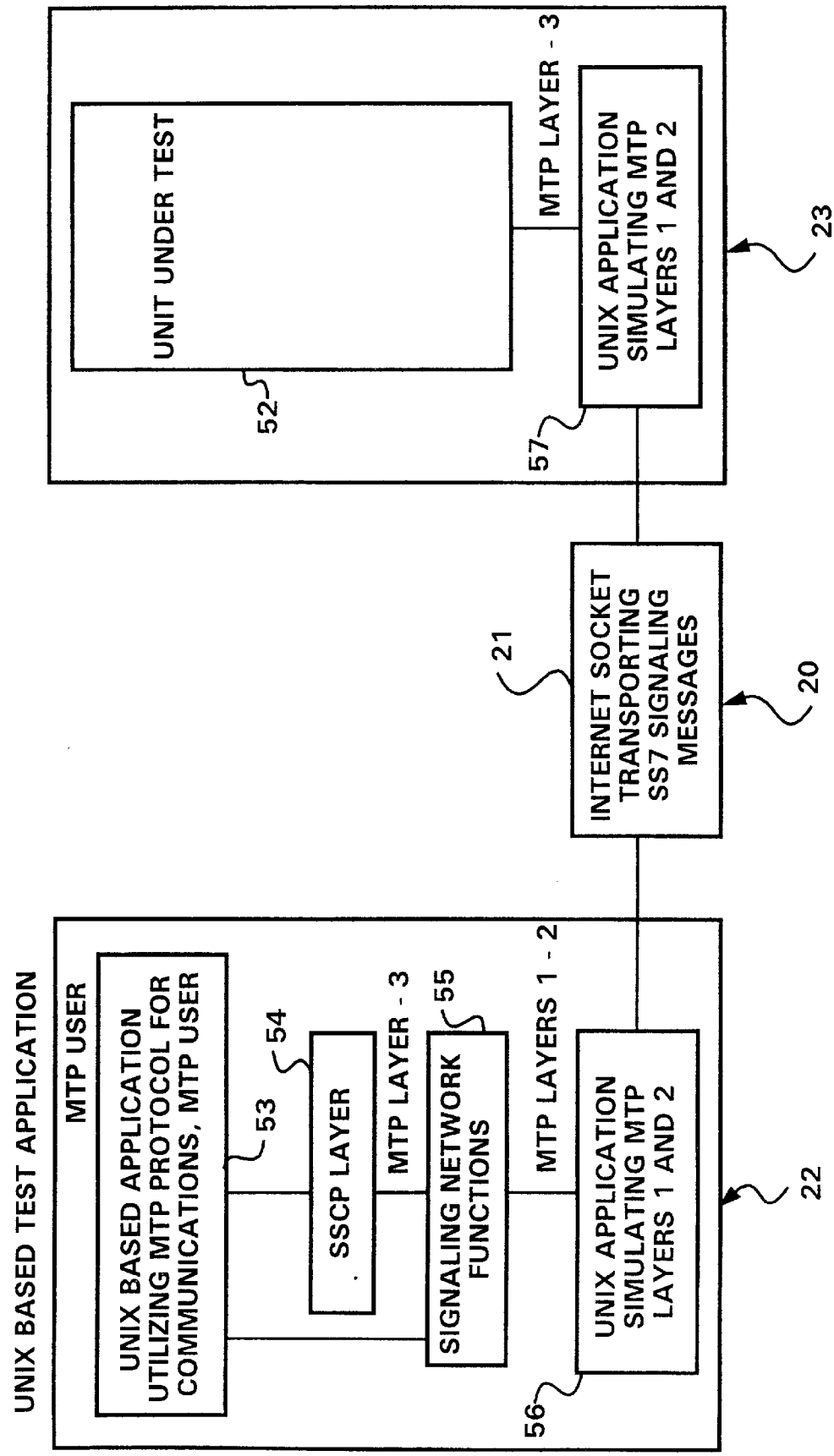
FIG. 5 is a block diagram illustrating in more detail the protocol stacks and communication link of FIG. 3.

FIG. 5 is a block diagram illustrating in more detail the protocol stacks 22 and 23, and the communication link 20 of FIG. 2. Protocol stack 22 may be a UNIX-based test application which communicates with a unit under test 52 via the Internet socket 21. The test application includes a MTP comprising the OSI model protocol stack. At the MTP User level (layer 7), there is a UNIX-based application 53 utilizing an MTP protocol for communications with the MTP User. Moving down the protocol stack, there is a Signaling Connection Control Part (SCCP) layer 54 and a MTP layer 3 55 which performs signaling network functions. Below MTP layer 3 are MTP layers 1 and 2 where, in the present invention, the normal MTP layers 1 and 2 hardware related components have been replaced by a UNIX application 56.

The Internet socket 21 transports packaged data from the UNIX application 56 in the UNIX-based test application to a second UNIX application 57 simulating the hardware components of normal MTP layers 1 and 2 in the unit under test 52. Specifications made between the UNIX applications 56 and 57 allow them to communicate the OSI layer 3–7 information between the applications without dynamic assignment of layer 2 information by using UNIX utilities, with or without utilizing LAN communication and protocols.

When utilized in the specific application of communicating the ANSI SS7 protocol, SS7 messages are packaged from OSI layer 7 to the layer 3 level and passed from the test application 22 to the unit under test 52 using the UNIX platform and utilities. The unit under test receives the data for processing, executes functions in the unit under test, and may package response information for OSI layers 3–7 for handling in the test application.

Figure 6:
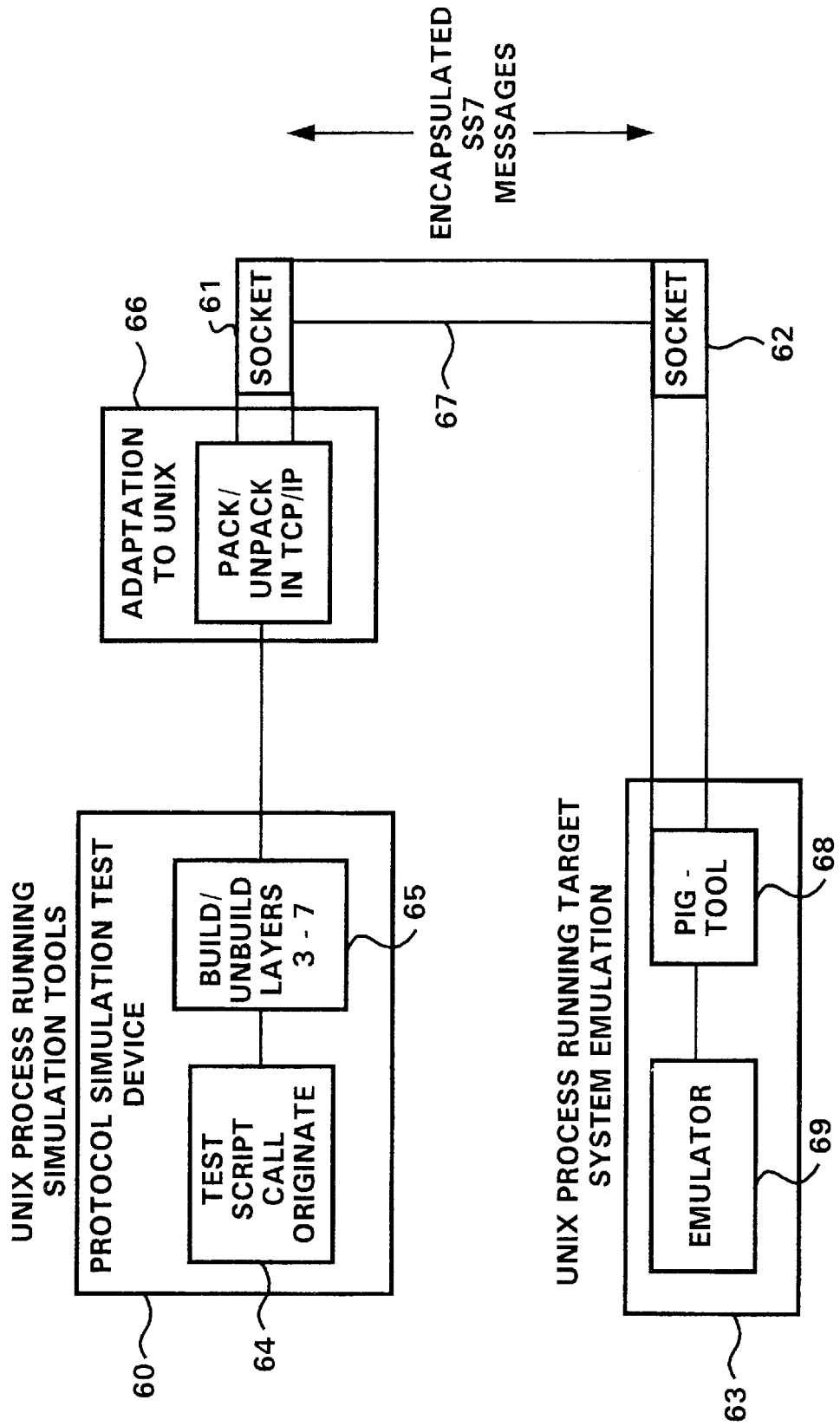
FIG. 6 is a block diagram of an embodiment of the present invention in which a protocol simulation test device interfaces with a telecommunication switch emulator via an Internet socket.

FIG. 6 is a block diagram of an embodiment of the present invention in which a protocol simulation test device (protocol simulator) 60 interfaces via Internet sockets 61 and 62 with a UNIX process 63 running a target system emulation. The protocol simulator 60 comprises a UNIX process running standard simulation tools. The standard tools include test script software 64 that performs the call origination functions. These scripts are then built into OSI layers 3–7 in block 65 and sent to a UNIX adaptor 66. The UNIX adaptor packages the layers in TCP/IP format for transmission through Internet sockets 61 and 62 and a LAN connection 67 to the UNIX process running the target system emulation 63. The emulation process 63 includes a protocol interface gateway (PIG-tool) 68 and a target system emulator 69. The PIG-tool 68 unpacks the OSI layers received from the socket in TCP/IP format and converts them to processor instructions. The instructions are then passed to the target system emulator 69.

The target system emulator 69 emulates the hardware of a target telecommunication node operating in the UNIX environment, and is capable of sending and receiving signaling information at the OSI layer 3 level or higher. The emulator 69 may communicate with an interfacing application using Internet sockets or other UNIX facilities such as pipes or interface 67 to send and receive the OSI layer 3–7 information. After performing required functions on the received information, the emulator may respond with communications back to the protocol simulator 60 using the same method of packaging in TCP/IP format, and transmission through Internet sockets to transfer the data to the protocol simulator for verification by the test script.

Figure 7:
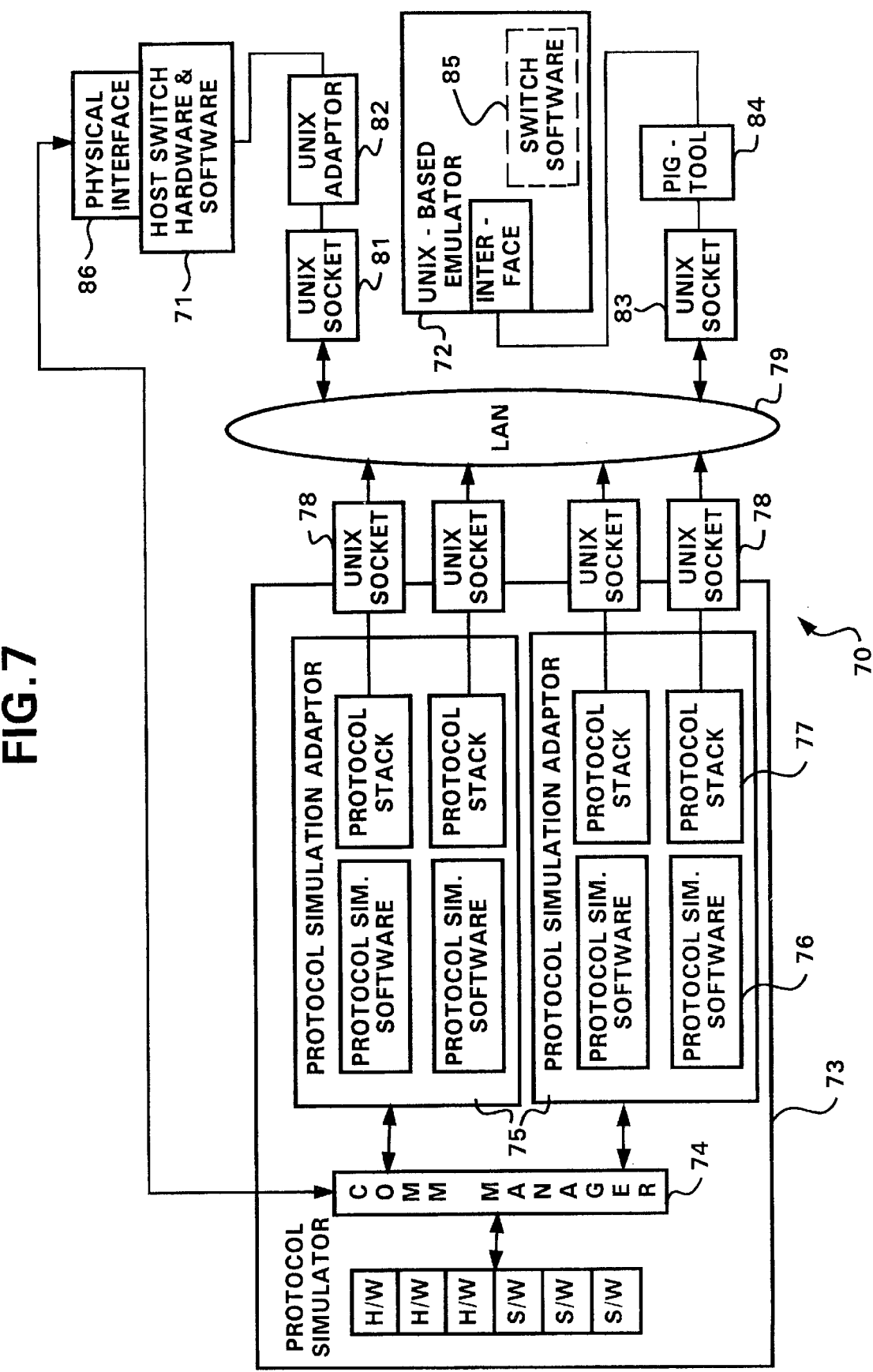
FIG. 7 is a simplified block diagram of an automated diagnostics system in which both a target telecommunication switch and a switch emulator are connected to a protocol simulator in accordance with the teachings of the present invention.

FIG. 7 is a simplified block diagram of an automated diagnostics system 70 in which both a target telecommunication switch 71 and a switch emulator 72 are connected to a protocol simulator 73 in accordance with the teachings of the present invention. The protocol simulator 73 may be alternately referred to in various computer-generated figures as a Protocol Adaptable State Machine (PASM) or a Message Generator Traffic Simulator (MGTS). The protocol simulator 73 enables a user to select either an actual target hardware node or a node emulated by software for the testing of OSI layers 3–7. If a hardware node is selected (for example, the target telecommunication switch 71), a communications manager 74 identifies this selection to a protocol simulation socket adaptation module (protocol simulation adaptor) 75 which then selects the proper protocol simulation software 76 and protocol stack 77 for the hardware node. Messages in UNIX-based TCP/IP protocol are sent through one of a plurality of Internet sockets 78 to a LAN 79. The messages exit the LAN through an Internet socket 81 and are directed to a UNIX adaptor 82. The UNIX adaptor 82 translates the TCP/IP protocol to SS7 messages which are understood by the target telecommunication switch 71.

If an emulator is selected (for example the switch emulator 72), the communications manager 74 identifies this selection to a protocol simulation adaptor 75 which then selects the proper protocol simulation software 76 and protocol stack 77 for the emulated system. Messages in UNIX-based TCP/IP protocol are sent through one of the plurality of Internet sockets 78 to the LAN 79. The messages exit the LAN through a gateway Internet socket 83 and are directed in the preferred embodiment to a protocol interface gateway (PIG-tool) 84.

The protocol simulation adaptor 75 is an simulation of a Message Generation Traffic Simulator (MGTS) hardware chassis running as a process or a group of processes on a workstation. The protocol simulation adaptor 75 includes protocol simulation software 76 and associated protocol stacks 77. It offers the ability to perform test sequence verification without accessing a hardware chassis. Users may debug and trouble shoot test sequences prior to connecting the target hardware node 71 or 72.

For communication with an emulator, the protocol simulation adaptor 75 utilizes the SS7 TCP/IP protocol. Test messages may also include header octets that are proprietary between the protocol simulator and target or emulated telecommunication node to identify the source of the message, message length, protocol revision, etc. The test messages are communicated through one of the Internet sockets 78 over the LAN 79 such as, for example Ethernet, through the gateway Internet socket 83 to the PIG-tool 84. The PIG-tool 84 strips off the TCP/IP protocol and headers, and converts the test messages to CPU instructions. The CPU instructions are then sent to the emulator 72 for processing and exercising the software to be tested. The emulator 72 includes the application software blocks 85 from the simulated telecommunication node as well as software modules that emulate the hardware of the target node. The emulator exercises the software to be tested, verifies the use of the simulated communications protocol with the target telecommunication node, and responds back toward the protocol simulator 73. Therefore, after a user develops test sequences for an application on the emulator 72, the protocol simulator 73 may be utilized to test the application on the target hardware 71 using the same test sequences.

As shown in FIGS. 6 and 7, once the testing of the application is completed on target hardware 71, the emulator 72 and target hardware 71 may communicate directly over the LAN 79 utilizing encapsulated SS7 messages sent in the TCP/IP protocol, thereby verifying in a real environment that the SS7 signaling is functioning correctly. Of course, two telecommunication switches may also communicate directly with each other using SS7 signaling as long as reliable network connections are made for each switch. As shown in FIG.3, Internet socket connections may be utilized for this purpose. The use of Internet socket connections also enables the switches to reside on different LANs, as long as the switches are two end points of an Internet connection. Other components of the test system 70 may also reside at different physical locations that have Internet accessibility via a LAN or other reliable Internet connection type, as long as each element utilizes an Internet socket connection.

The protocol simulator 73 may also test applications through the Internet socket 78 and through a physical interface 86 with the target host hardware 71 simultaneously. Additionally, the protocol simulator 73 may control other testing devices (not shown) through the Internet socket 78 and the LAN 79.

Figure 8:
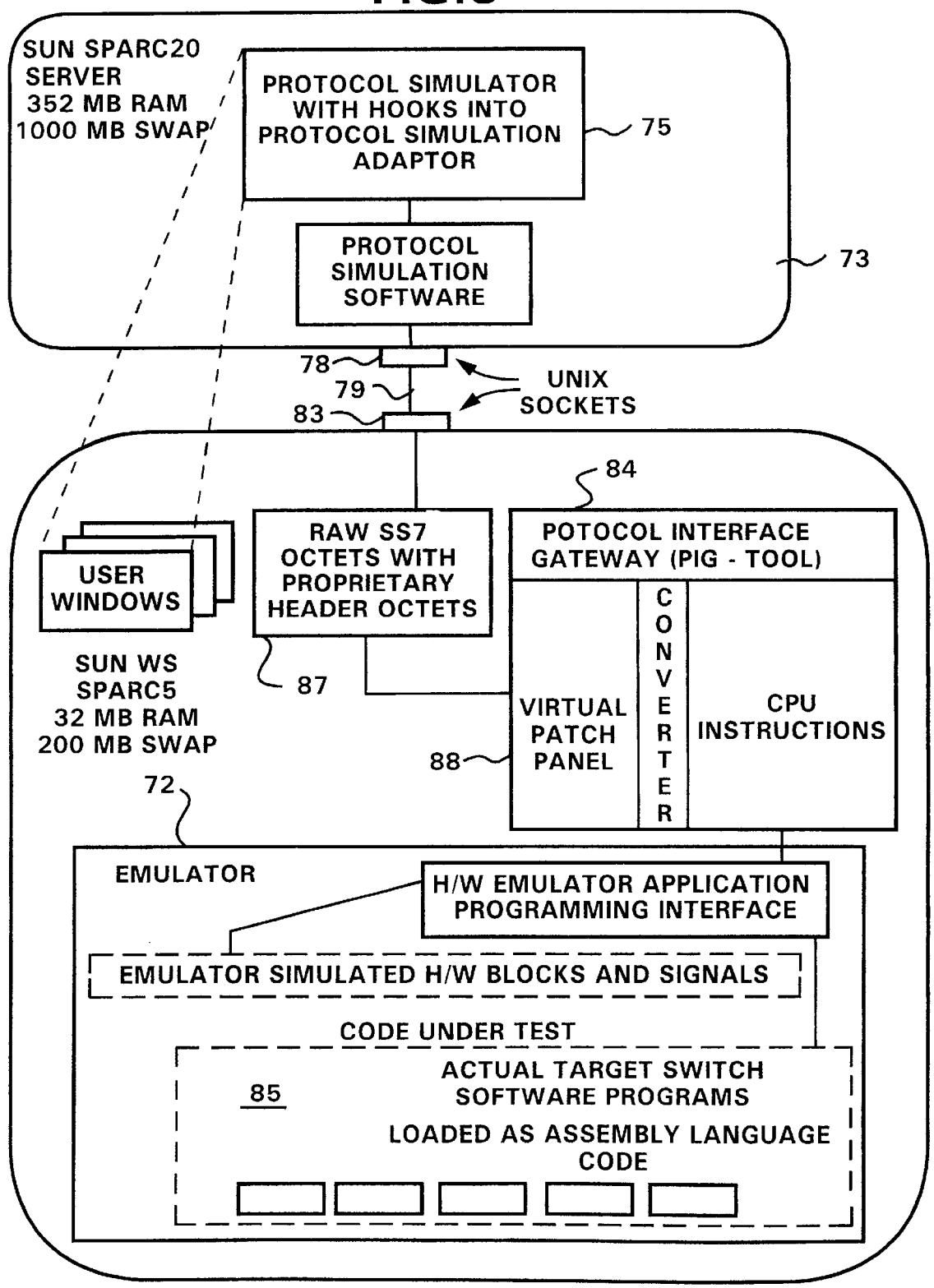
FIG. 8 is a more detailed block diagram of the emulator and PIG-tool of FIG. 7.

FIG. 8 is a more detailed block diagram of the UNIX-based emulator 72 and PIG-tool 84 of FIG. 7. The protocol simulator 73, which includes hooks into the protocol simulation adaptor 75, runs the protocol simulation software 76. In the preferred embodiment, the protocol simulator 73 is configured to service 12 users, and utilizes a Sparc 20 Server from SUN Microsystems having 32 Mb RAM and 1,000 Mb swap space on the server's hard drive. The UNIX-based emulator 72 and PIG-tool 84 may be operated on a SUN Sparc 5 Workstation having 32 Mb RAM and 200 Mb swap space on the workstation's hard drive. For an embodiment servicing a single user, the protocol simulator 73 may also be operated on a SUN Sparc 5 Workstation. These hardware configurations are described for illustrative purposes only, and are not intended to limit the scope of the present invention which may be implemented with other hardware configurations.

The PIG-tool 84 receives raw SS7 octets ( OSI layers 3–7) 87, with or without proprietary header octets, from the gateway Internet socket 83 which is connected to the Ethernet LAN 79. The SS7 octets enter the PIG-tool 84 through a Virtual Patch Panel (VPP) 88. Within the PIG-tool, the SS7 octets are collected until a complete SS7 Message Signal Unit (MSU) is received.

The PIG-tool 84 determines the source of the MSU through the Internet socket on which the MSU was received. If the MSU was received from the protocol simulator 73, the proprietary header octets, if present, are stripped off and processed. If the MSU was received from the emulator 72 in the form of one or more emulator instructions, these instructions are processed by the PIG-tool into a MSU buffer (not shown).

When the MSU has been fully received, the PIG-tool 84 consults routing tables which are specified by the user and are internally stored and maintained in the VPP 88. The routing tables associate source entities with destination entities. Once the destination of the MSU is determined from the routing tables, the PIG-tool processes the message into the suitable format for the destination. If the destination is the protocol simulator 73, this processing involves the optional encapsulation of the MSU with the proprietary header, if one was utilized. If the destination of the MSU is the emulator 72, the MSU is broken up into the appropriate number of emulator instructions and sent into the emulator for processing by the software instruction being tested.

Figure 9:
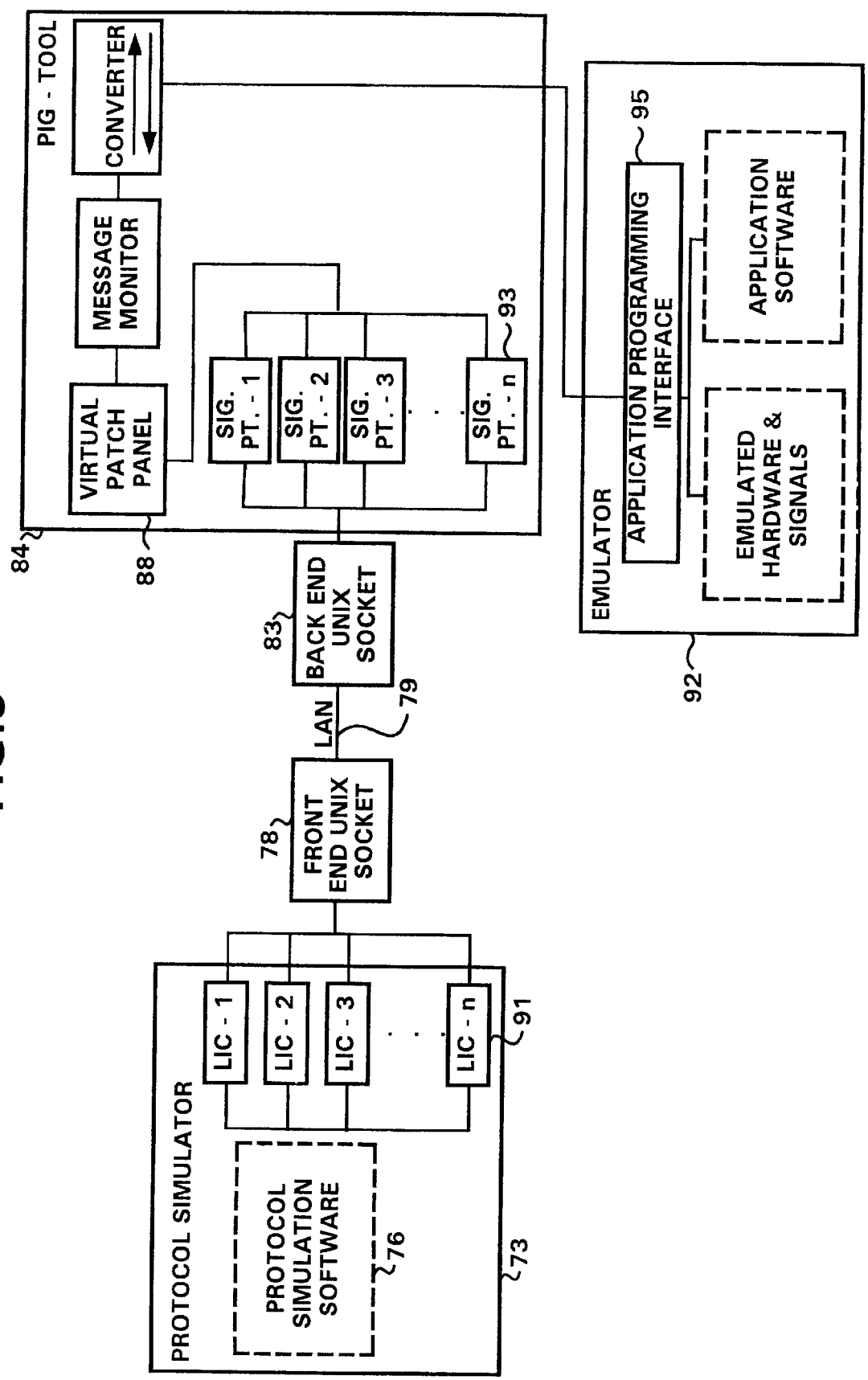
FIG. 9 is a simplified block diagram illustrating the simulation of a plurality of line interface cards (LICs) by the Protocol Simulator and their connection through an Internet socket and LAN to an emulator and a plurality of simulated signaling points.

FIG. 9 is a simplified block diagram illustrating the simulation of a plurality of line interface cards (LICs) 91 by the protocol simulator 73 and their connection through Internet sockets 78 and 83 and LAN 79 to an emulator 92 and a plurality of simulated signaling points 93. In one embodiment of the present invention, the protocol simulator 73 may simulate up to 16 LICs 91, and the emulator 92 may connect to the LAN with up to 16 signaling points 93, all of which are connected through Internet sockets 78 and 83 and an Ethernet LAN 79. This number of LICs and signaling points is not a limitation on the present invention, but is presented as an exemplary embodiment only. In other embodiments, a greater or lesser number of LICs and signaling points may be utilized.

Detailed Example

Figure 10:
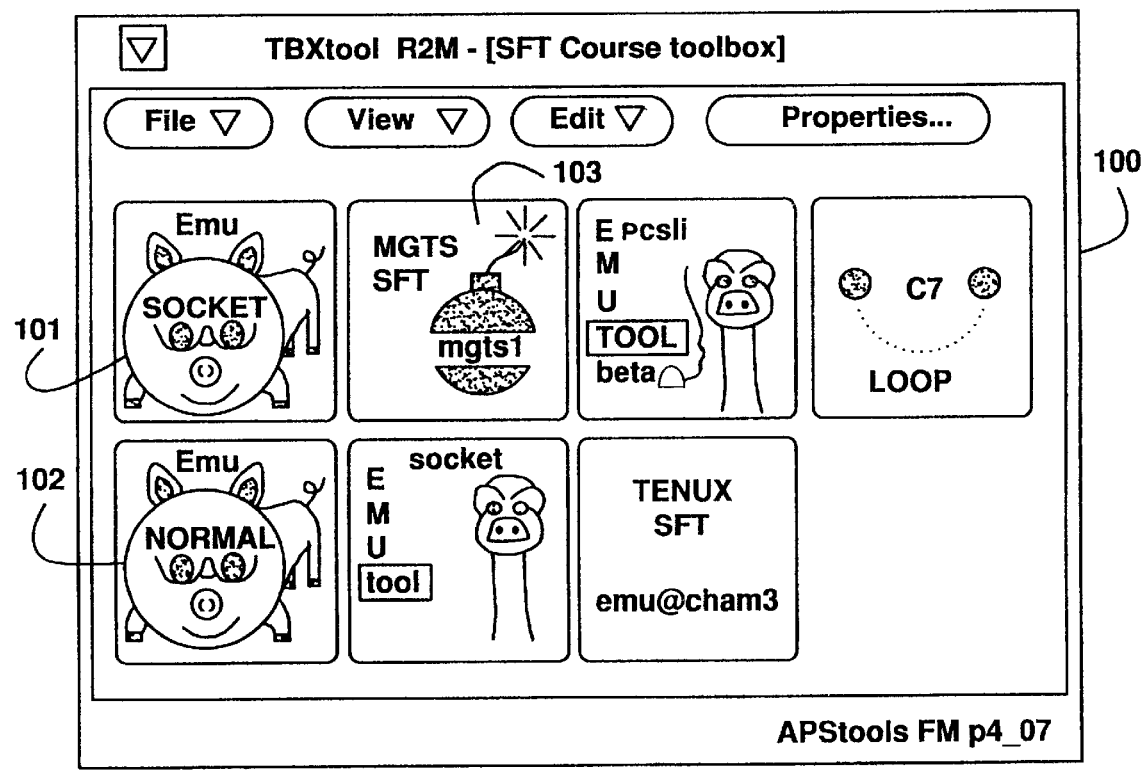
FIG. 10 is an illustration of a computer-displayed Icon tool box which may be utilized by an operator to initiate testing with the development test system of the present invention.

FIG. 10 is an illustration of a computer-displayed Icon tool box 100 which may be utilized by an operator to initiate testing with the development test system of the present invention. The operator may control the system from either the emulator workstation or the protocol simulator workstation. A first PIG-tool Icon 101 is labeled "socket", and a second PIG-tool Icon 102 is labeled "normal". The PIG-tool 84 is capable of interfacing with two different emulators, one that is 554 socket-based, and one "normal" emulator that is not socket based, and these Icons are utilized to select the type of emulator to interface with the PIG-tool. A "MGTS" Icon 103 is utilized to initiate the protocol simulation software 76 in the protocol simulator 73.

Figure 11:
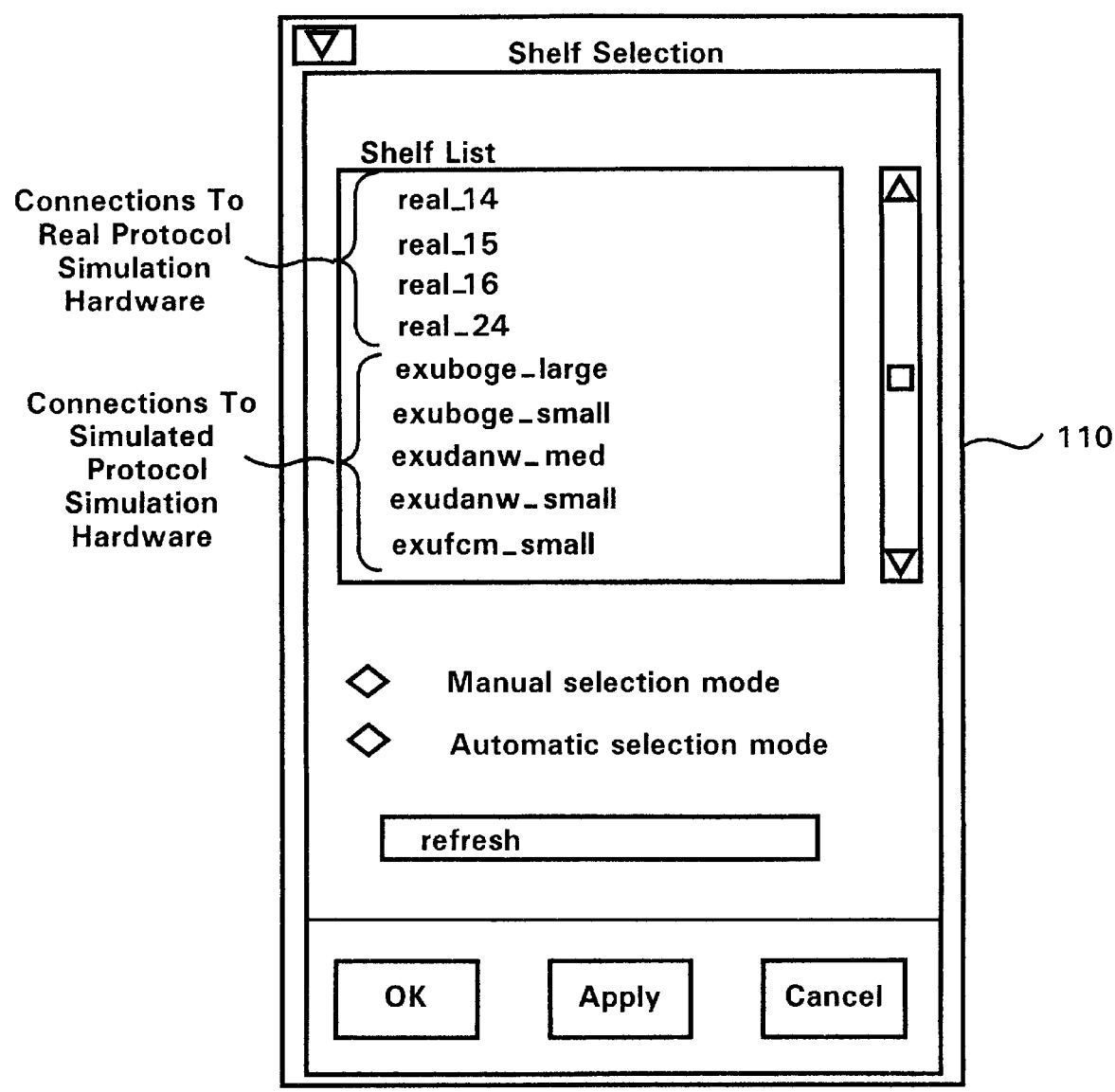
FIG. 11 is an illustration of a computer-displayed shelf selection menu which enables an operator to select a real hardware system or an emulated system for testing purposes.

FIG. 11 is an illustration of a computer-displayed shelf selection menu 110 which enables an operator to select a real hardware system or an emulated system for testing purposes. Selection of a menu item labeled "real" connects the protocol simulator 73 to a real target hardware system. Selection of a menu item beginning with "exu . . . " connects the protocol simulator 73 to an emulated system. The emulated systems are divided into three categories—small, medium, and large—depending on the number of line interface cards (LICs) 91 associated with the selected menu item.

Figure 12:
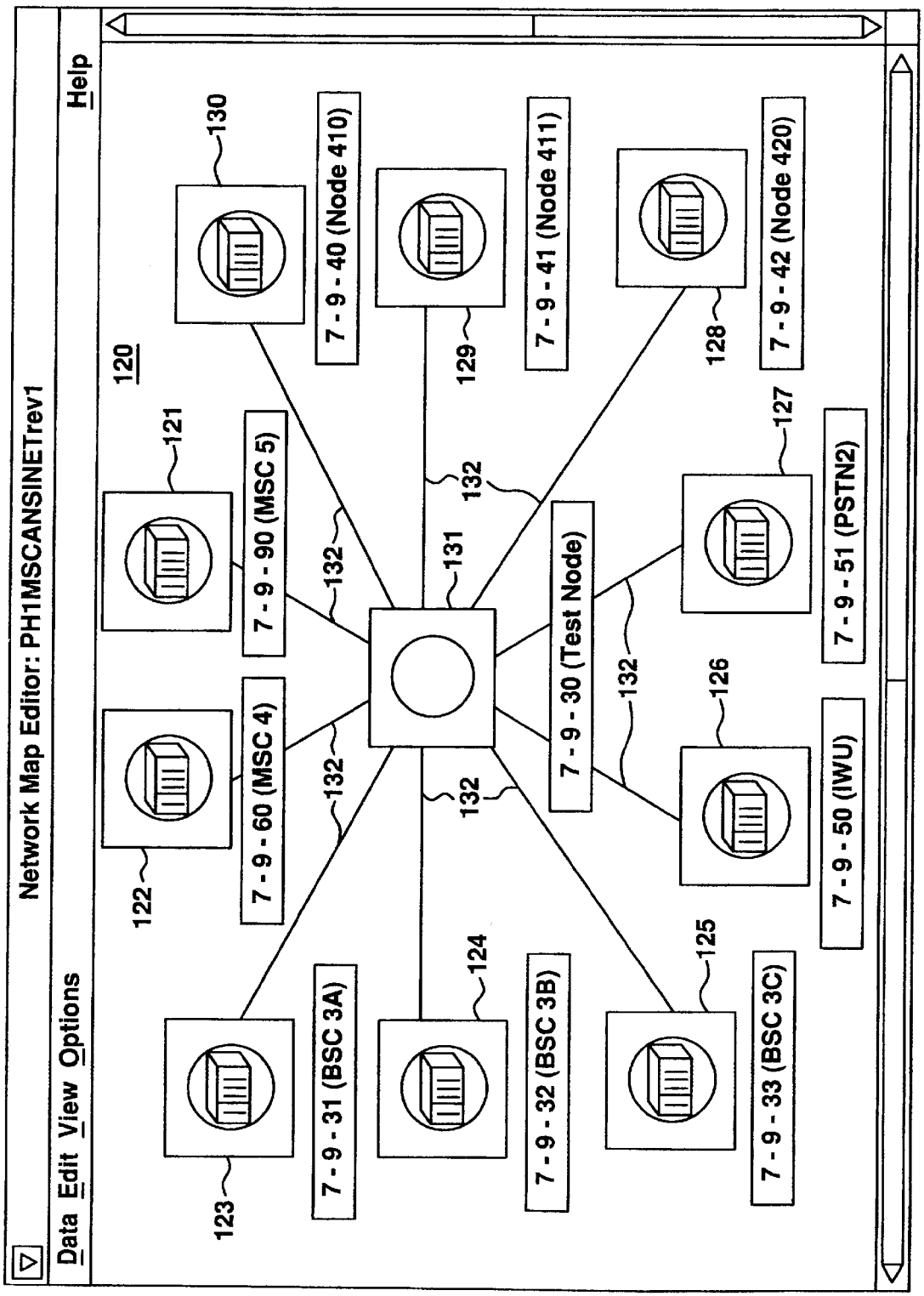
FIG. 12 is an illustration of a computer-displayed network map editor utilized to define the testing environment to the development test system.

FIG. 12 is an illustration of a computer-displayed network map editor 120 utilized to define the testing environment to the development test system of the present invention. A set of simulated nodes 121–130 surrounds a node under test (test node) 131 positioned in the center of the display. The test node 131 may be a real target hardware system or an emulated system, depending on the type of system selected by the operator utilizing the shelf selection menu 110 of FIG. 11. If the operator chooses a real target hardware system, then the connections 132 between the test node 131 and the surrounding nodes 121–130 are physical links. If the operator chooses an emulated system, then the connections 132 between the test node 131 and the surrounding nodes 121–130 are simulated SS7 links. Each node is labeled with a signaling point code (e.g., 7-9-60) and a short name for the node being simulated (e.g., MSC 4).

Figure 13:
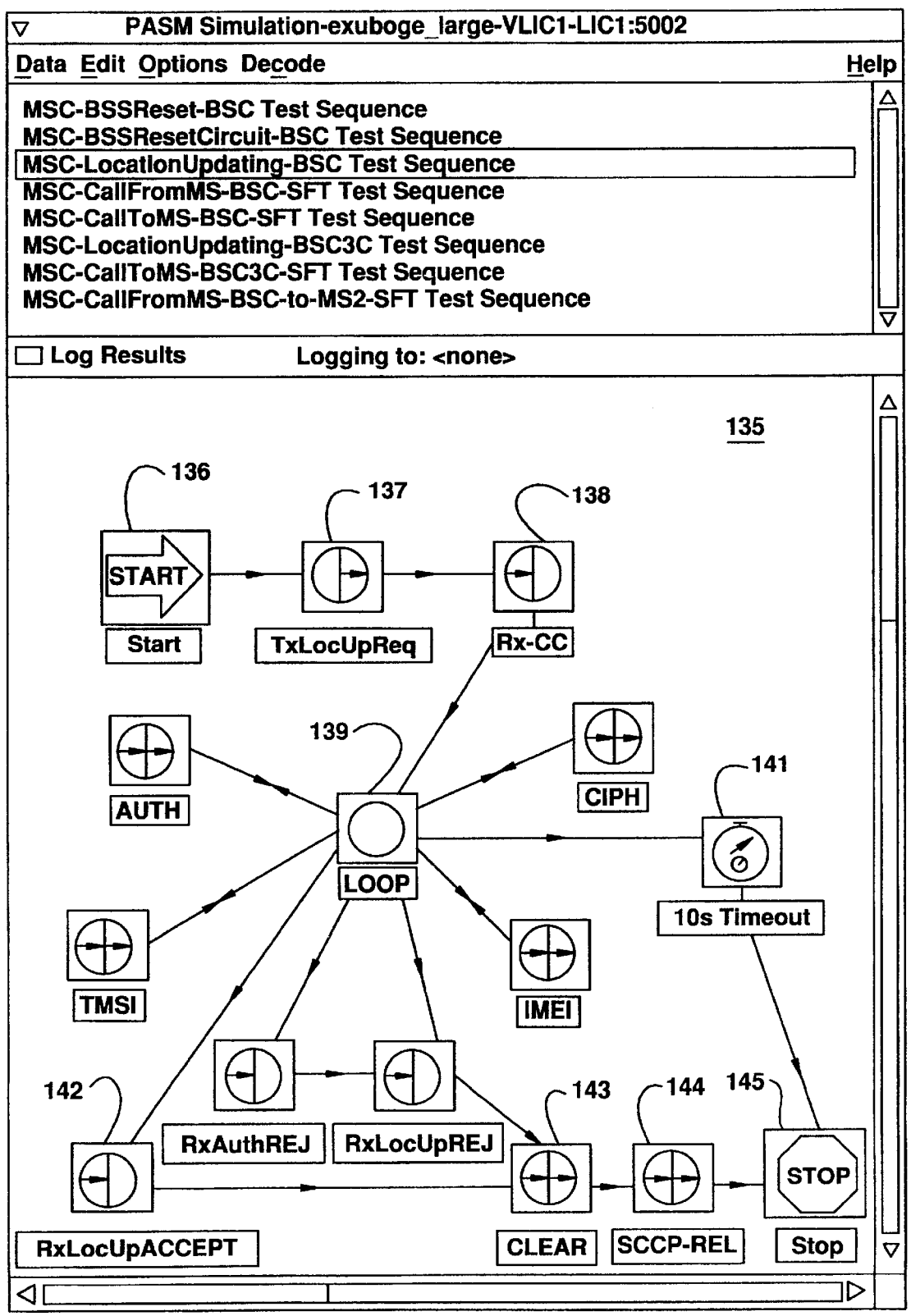
FIG. 13 is an illustration of a computer-displayed network map illustrating a simulation in the protocol simulator of a simple location updating sequence performed in a Base Station Controller (BSC) in a Personal Communication System (PCS) mobile telecommunication system.

FIG. 13 is an illustration of a computer-displayed network map (simulation script) illustrating a simulation in the protocol simulator of a simple location updating sequence performed in a Base Station Controller (BSC) in a Personal Communication System (PCS) mobile telecommunication system. When a mobile subscriber turns on a mobile telephone, the location updating sequence is initiated as shown at step 136 of the protocol simulation of the BSC. The BSC then sends a location updating request message 137 to its Mobile Switching Center (MSC) which, in turn, updates the location of the mobile subscriber in the subscriber's home location register (HLR). A confirmation message is then returned from the MSC to the BSC at 138.

In FIG. 13, simulated nodes that receive messages are illustrated with arrows to the left of a center vertical line. Simulated nodes that transmit messages are illustrated with arrows to the right of the center vertical line. Simulated nodes that both receive and transmit messages are illustrated with arrows on both sides of the center vertical line. A simulated node 139 labeled "Loop" is positioned in the center of the display and is a holding point where the simulation waits for another message to be received. A timer 141 monitors the loop for activity, and if there is no activity for a preset time period (e.g., 10 seconds), the test sequence is stopped.

The process starts at node 136 and moves to node 137 where the BSC transmits the location updating request message to the MSC. In the development test system of the present invention, this request message may go to a real target MSC and HLR, or may go through the PIG-tool 84 to an emulator with traffic handling software and a built-in HLR. The location updating request message is in SS7 format, and the PIG-tool converts it to emulator instructions. When the emulator processes and responds to the request, the PIG-tool converts the response back to SS7 format for transmission to the BSC simulation. When the MSC emulator responds with the request message, the BSC simulation receives a connection confirmation (CC) message at node 138. The process then moves to the loop node 139 and waits for the MSC emulator to respond to the request message. If the location updating request is accepted, the BSC simulation receives a location updating accept message at node 142. The link to the MSC/emulator is then cleared at node 143, and a release complete message is sent at node 144. The process then ends at 145.

Figure 14:
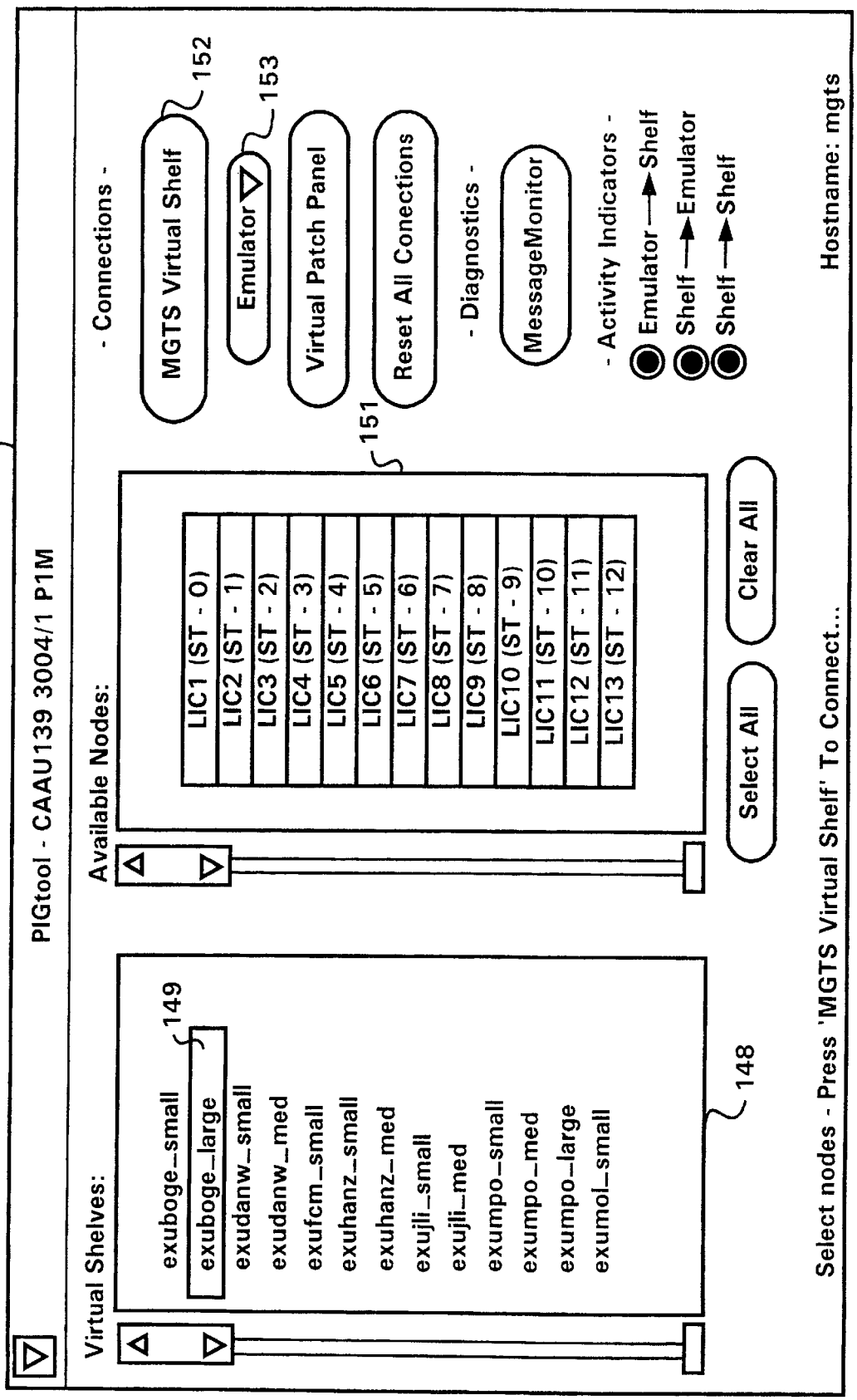
FIG. 14 is an illustration of a computer-displayed menu of emulated systems (virtual shelves) which the PIG-tool may access.

FIG. 14 is an illustration of a computer-displayed menu 146 of protocol simulation systems (virtual shelves) 148 which the PIG-tool 84 may access. This list is identical to the protocol simulation systems listed in the shelf selection menu 110 in the protocol simulator illustrated in FIG. 11. When a protocol simulation system is selected (e.g., exuboge_large 149), a list of available nodes or line interface cards (LICs) 151 associated with the selected system is displayed. The list of LICs 151 also includes a reference to signaling points (STs) which correspond to data in the emulated telecommunication system. Once the operator selects the protocol simulation system and LICs that are to be utilized in testing, clicking on the button 152 labeled "MGTS Virtual Shelf" establishes a connection to the gateway Internet socket 83 (FIG. 7). When that connection is made, clicking on the "Emulator" button 153 establishes a connection to the emulator. Thus, the PIG-tool 84 makes a connection between a simulated LIC generated by the protocol simulator and a signaling point in the emulated system.

Figure 15:
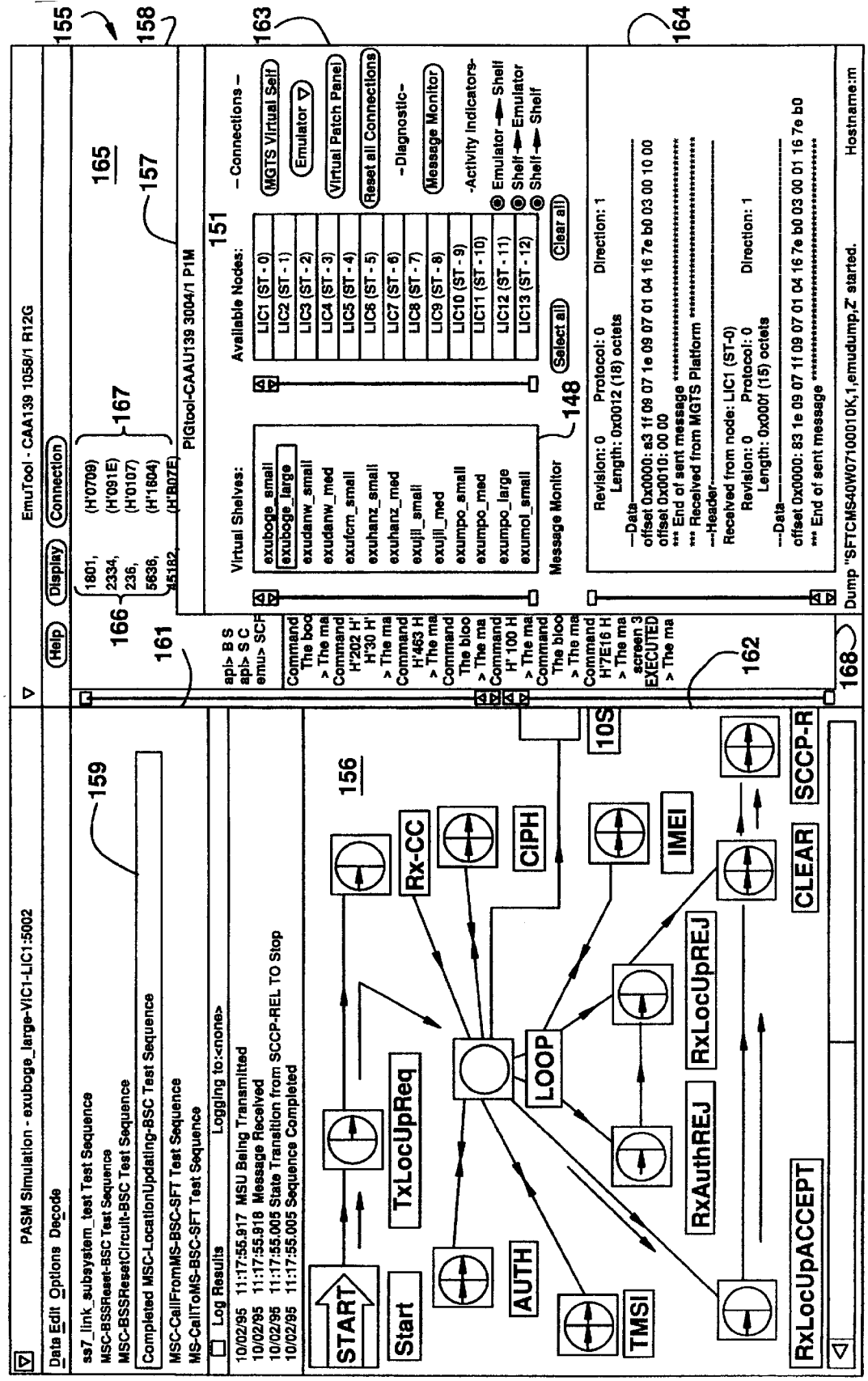
FIG. 15 is an illustration of a computer-display showing three status windows corresponding to the protocol simulator, the PIG-tool, and the emulator.

FIG. 15 is an illustration of a computer-display 155 showing three status windows corresponding to the protocol simulator (labeled as PASM Simulation) 156, the PIG-tool 157, and the emulated system (labeled as EmuTool) 158. An upper section 159 of the protocol adaptable state machine (PASM) Simulation window 156 indicates that the location updating sequence has been performed in the Mobile Switching Center/Home Location Register (MSC/HLR) and that the BSC protocol simulation has been verified by the protocol simulator. A middle section 161 is a log showing the times that particular messages were transmitted and received. A bottom section 162 illustrates the simulation script 135 of FIG. 13 with the path of the simulation indicated by arrows.

The PIG-tool window 157 includes an upper section 163 that shows the menu of protocol simulation systems (virtual shelves) 148 which the PIG-tool 84 may access. A lower section 164 is a message monitor which provides data about the messages being transmitted and received between the protocol simulator 73 and the PIG-tool 84, as the data passes through the gateway socket 83 (FIG. 7).

The emulator window 158 provides information on commands and data going from the PIG-tool 84 to the emulator 72. As shown in FIG. 9, a converter 94 in the PIG-tool 84 converts the SS7 hex to emulator code and sends it to an application programming interface (API) 95. An upper emulator log section 165 (FIG. 15) shows the commands received in emulator code 166 and the signal connection point 167 for each received command. A lower command section 168 (partially concealed) provides a condensed version of the commands sent from the PIG-tool 84 to the emulator 72.

FIG. 16 is a more detailed listing of the message monitor section 164 of the PIG-tool status window 157 of FIG. 15. Data is provided on all the LICs that have been selected for testing. The window 164 displays a source for each message (e.g., "Received from MGTS Platform") 171, proprietary header information 172, and the data carried in the message 173. The header information 172 indicates the revision, protocol, direction, and the length of the SS7 message. The message data 173 is presented in octets (8 bits) of SS7 data in hexadecimal representation. The PIG-tool 84 may send messages to the emulator 72 at the same time that it is receiving messages from the protocol simulator 73 (FIG. 7).

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A protocol interface gateway for connecting a telecommunication system emulator to a data network, said gateway comprising:

means for receiving data signals from said data network and sending data signals to said data network, said data signals formatted in a data network protocol;

means for converting said data signals into telecommunication signals formatted in a telecommunication network protocol, and for converting said telecommunication signals into said data signals;

means for converting said telecommunication signals into instructions in emulator code, and converting processed instructions in emulator code into telecommunication signals in said telecommunication network protocol; and means for sending said instructions in emulator code to said emulator and receiving said processed instructions in emulator code from said emulator.

2. The protocol interface gateway of claim 1 wherein said means for receiving data signals from said data network formatted in a data network protocol includes a UNIX socket that replaces Open Systems Interconnection (OSI) layers 1 and 2 of said data network protocol.

3. The protocol interface gateway of claim 2 wherein said means for receiving data signals from said data network formatted in a data network protocol includes means for receiving data signals formatted in any Signaling System 7 (SS7) compatible protocol.

4. The protocol interface gateway of claim 3 wherein said emulator includes means for emulating a target telecommunication node by processing said instructions in emulator code and, in turn, executing code in blocks of application software utilized in said target telecommunication node.

5. The protocol interface gateway of claim 4 wherein said data network is a local area network (LAN).

6. The protocol interface gateway of claim 5 wherein said local area network is an Ethernet LAN.

7. A method of connecting a telecommunication system emulator to a data network, said emulator emulating a target telecommunications node, said method comprising the steps of:

receiving data signals from said data network with a protocol interface gateway, said data signals formatted in a data network protocol;

converting, in said protocol interface gateway, said received data signals into telecommunication signals formatted in a telecommunication network protocol;

converting, in said protocol interface gateway, said telecommunication signals into instructions in emulator code;

sending said instructions in emulator code from said protocol interface gateway to said emulator for processing;

executing in said emulator, code in blocks of application software utilized in said target telecommunications node;

receiving said processed instructions in emulator code from said emulator with said protocol interface gateway;

converting, in said protocol interface gateway, processed instructions in emulator code into telecommunication signals in said telecommunication network protocol;

converting, in said protocol interface gateway, said telecommunication signals into data signals formatted in said data network protocol; and sending said data signals in said data network protocol from said protocol interface gateway to said data network.

8. The method claim 7 wherein said step of receiving data signals from said data network formatted in a data network protocol includes replacing Open Systems Interconnection (OSI) layers 1 and 2 of said data network protocol with a UNIX socket.

9. The method claim 8 wherein said step of receiving data signals from said data network formatted in a data network protocol includes receiving signals formatted in any Signaling System 7 (SS7) compatible protocol.

10. The method of claim 9 wherein said step of receiving data signals from said data network with said protocol interface gateway includes receiving said data signals from a local area network (LAN).

11. The method of claim 10 wherein said step of receiving said data signals from a local area network includes receiving said data signals from an Ethernet LAN.

12. A method of communicating between a first telecommunications node and a second telecommunications node over a data network, said method comprising the steps of:

encapsulating messages in a telecommunications protocol in the Transmission Control Protocol/Internet Protocol (TCP/IP) protocol;

connecting the first telecommunications node to a data network utilizing a first Internet socket connection;

connecting the second telecommunications node to the data network utilizing a second Internet socket connection; and transmitting encapsulated telecommunications protocol messages via said data network from said first telecommunications node to said second telecommunications node.

13. The method of communicating between a first telecommunications node and a second telecommunications node of claim 12 wherein said step of encapsulating messages in a telecommunications protocol in the TCP/IP protocol includes encapsulating Signaling System 7 (SS7) messages in the TCP/IP protocol.

14. The method of communicating between a first telecommunications node and a second telecommunications node of claim 13 wherein said step of transmitting encapsulated telecommunications protocol messages via said data network from said first telecommunications node to said second telecommunications node includes transmitting encapsulated SS7 messages via said data network from said first telecommunications node to said second telecommunications node in the TCP/IP protocol.

15. The method of 1 between a first 1 node and a second telecommunications node of claim 14 wherein said steps of connecting the first telecommunications node to a data network and connecting the second telecommunications node to a data network include connecting the first and second telecommunications nodes to the Internet utilizing said first and second Internet socket connections.

16. The method of communicating between a first telecommunications node and a second telecommunications node of claim 14 wherein said step of connecting the first telecommunications node to a data network utilizing a first Internet connection includes the steps of:

connecting the first telecommunications node to a first local area network (LAN); and connecting the first LAN to the Internet.

17. The method of communicating between a first telecommunications node and a second telecommunications node of claim 16 wherein said step of connecting the second telecommunications node to a data network utilizing a second Internet socket connection includes the steps of:

connecting the second telecommunications node to a second LAN; and connecting the second LAN to the Internet.

\* \* \* \* \*